United States Patent [19]

Takagi et al.

[11] 3,908,475
[45] Sept. 30, 1975

[54] CENTRIFUGALLY CONTROLLED EXPANSIBLE PULLEY WITH TORQUE CAM ACTUATION

[75] Inventors: Izumi Takagi; Shigeo Adachi, both of Akashi, Japan

[73] Assignee: Kawasaki Jukogyo Kabushiki Kaisha, Kobe, Japan

[22] Filed: Aug. 26, 1974

[21] Appl. No.: 500,521

[30] Foreign Application Priority Data
Sept. 1, 1973 Japan................................ 48-98715

[52] U.S. Cl................ 74/230.17 E; 74/230.17 M; 192/105 CP; 192/54
[51] Int. Cl.[2].................. F16H 55/52; F16D 43/06
[58] Field of Search............ 74/230.17 M, 230.17 E, 74/230.17 R, 230.17 B, 230.17 C, 230.17 D, 230.17 A; 192/105 CD, 103 A, 54

[56] References Cited
UNITED STATES PATENTS
3,395,587  8/1968  Casini.......................... 74/230.17 M
3,800,608  4/1974  Bessette ....................... 74/230.17 E
3,812,731  5/1974  Sugimoto ...................... 74/230.17 E

*Primary Examiner*—Samuel Scott
*Assistant Examiner*—Allan R. Burke
*Attorney, Agent, or Firm*—Donald J. Koprowski

[57] ABSTRACT

Infinitely variable V-belt type transmission in which the drive pulley assembly comprises a stationary pulley element secured to the drive shaft and a movable pulley element movable along and rotatable about the drive shaft, said stationary and movable elements defining a V-shaped circumferential groove therebetween, torsional spring means associated with the movable element for biasing the element in one angular direction, centrifugal means for angularly urging the movable element against the influence of the torsional spring means in accordance with the speed of said drive shaft, and cam means for axially displacing said movable element in accordance with angular displacement of the movable element with respect to the stationary element so that the effective diameter of the pulley assembly is determined in accordance with its speed and the load imposed thereon.

6 Claims, 6 Drawing Figures

CENTRIFUGALLY CONTROLLED EXPANSIBLE PULLEY WITH TORQUE CAM ACTUATION

The present invention relates to an automatic transmission and more particularly to an infinitely variable V-belt type transmission which can be used, but not exclusively, in a powered vehicle such as a snow mobile.

Conventionally, a V-belt type transmission includes a pair of pulley assemblies, each having a stationary pulley element secured to a shaft and a movable pulley element axially slidable along the shaft. The pulley elements are so arranged as to provide with their opposed sides a circumferential groove having a V-shaped cross-sectional configuration. A so-called V-belt engages the V-shaped grooves in the pulley assemblies and extends between the pulley assemblies so as to provide a power transmitting connection therebetween. The effective diameter of each pulley assembly is determined by the spacing between the pulley elements. In a conventional arrangement, one of the paired pulley assemblies, that is, the driving pulley assembly has been provided with centrifugal means for urging the movable pulley element toward the stationary pulley element under the influence of centrifugal force produced therein. This arrangement provides a speed ration adjustment in accordance with the speed of the input shaft which is connected to the stationary pulley element, but it is impossible to make an adjustment in accordance with the load imposed thereon. In an alternative arrangement, the effective diameter of the driven pulley assembly has been adjusted in accordance with the load imposed on the driven or output shaft, however, this arrangement has not been effective to make a positive speed ratio adjustment with a satisfactory sensitivity.

The present invention has an object to provide a V-belt type automatic transmission in which effective diameter of driving pulley assembly can be adjusted in accordance with the speed of the input shaft and also with the load imposed thereon.

Another object of the present invention is to provide an automatic transmission which is simple in construction and in which speed ratio can be changed in accordance with the speed and load with a satisfactory sensitivity.

In accordance with the present invention, the above and other objects can be achieved by an automatic transmission comprising a first pulley assembly including a stationary pulley element secured to a first shaft and a movable pulley element movable along and rotatable about the first shaft, said stationary and movable elements defining a V-shaped circumferential groove therebetween, torsional spring means associated with the movable element of the first pulley assembly for biasing the element in one angular direction, centrifugal means for angularly urging the movable element of the first pulley assembly against the influence of the torsional spring means in accordance with the speed of said first shaft, and cam means for axially displacing said movable element of the first pulley assembly in accordance with angular displacement of the movable element with respect to the stationary element of the first pulley assembly; a second pulley assembly including a stationaly pulley element secured to a second shaft and a movable pulley element slidable along the second shaft, said stationary and movable pulley elements defining a V-shaped circumferential groove therebetween, means for biasing the movable element toward the stationary element of the second pulley assembly; and an endless belt having a substantially V-shaped cross-sectional configuration for engaging said V-shaped grooves in the first and second pulley assemblies and extending around and between the pulley assemblies for establishing a power transmitting connection therebetween.

The above and other objects and features of the present invention will become apparent from the following descriptions of a referred embodiment taking reference to the accompanying drawings, in which.

Figure 1:
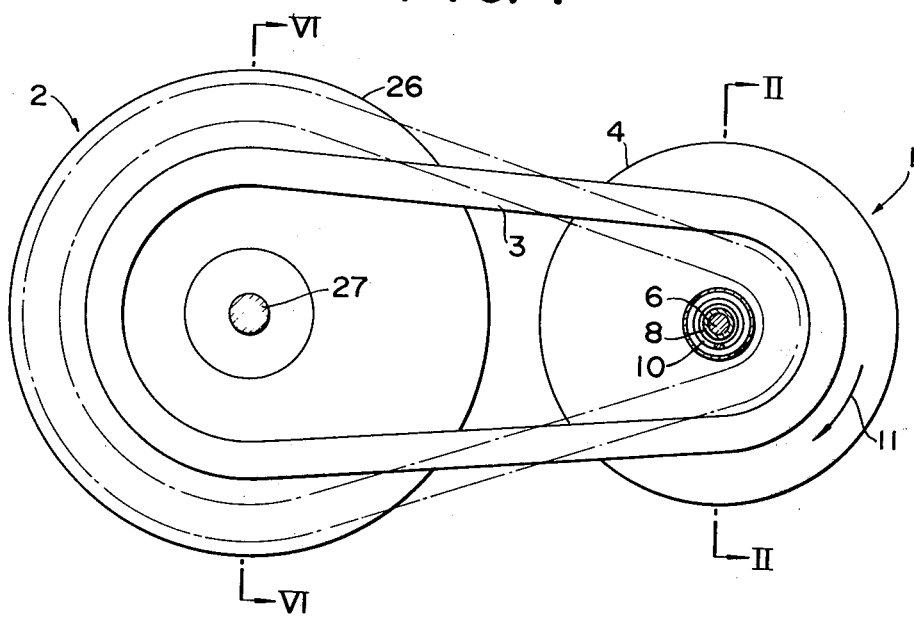
FIG. 1 is a longitudinal sectional view of a V-belt type transmission in which the present invention can be embodied.
Figure 2:
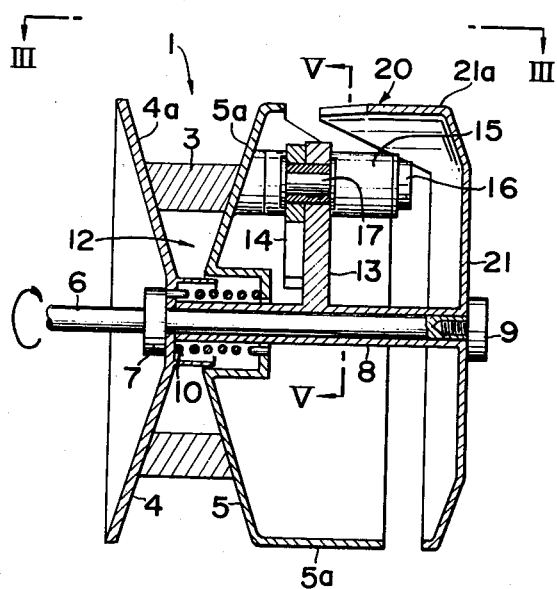
FIG. 2 is a sectional view taken along the line II—II in FIG. 1.

Referring now to the drawing, particularly to FIG. 1, there is shown a V-belt type automatic transmission including a driving pulley assembly 1, a driven pulley assembly 2 and an endless belt 3 passing around and extending between the pulley assemblies 1 and 2 for establishing a power transmitting connection therebetween. As shown in FIG. 2, the driving pulley assembly 1 comprises a stationary pulley element 4 and a movable pulley element 5. The stationary element 4 is secured to an input or driving shaft 6 by means of a stop 7 provided on the shaft 6 and a sleeve 8 fitted to the sahft 6 and secured thereto by an end bolt 9. The movable element 5 is axially movably and rotatably mounted on the sleeve 8 and a torsional spring 10 is disposed between the stationary and movable elements 4 and 6 so as to rotationally bias the movable element 5 in the direction opposite to that shown by an arrow 11 in FIG. 1. The pulley elements 4 and 5 have opposed surfaces 4a and 5a which define a circumferential groove 12 of substantially V-shaped cross-sectional configuration.

Figure 5:
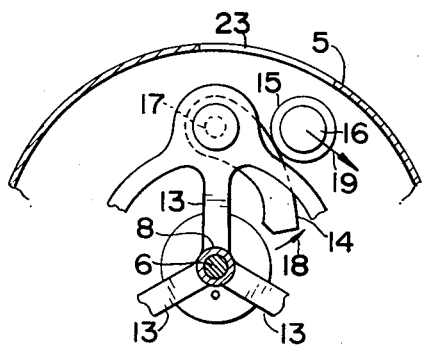
FIG. 5 is a sectional view taken along the line V—V in FIG. 2.

As shown in FIG. 2 and also in FIG. 5, the sleeve 8 is integrally formed with three radially extending arms 13 each of which pivotally carries a centrifugal weight 14 by means of a pin 17. The movable element 5 has a roller 15 for engagement with each of the centrifugal weights 14. Each roller 15 is rotatably mounted on a pin 16 secured to the movable element 5 and engages with the associated centrifugal weight 14 at the radially outward side thereof. Thus, it will be seen in FIG. 5 that, as the speed of the shaft 6 increases, the speed of the radial arms 13 and that of the weights 14 also increase so as to displace the weights 14 counterclockwise as shown by an arrow 18 in FIG. 5 whereby the rollers 15 and therefore the movable element 5 are displaced clockwise as shown by an arrow 19 in FIG. 5 with respect to the shaft 6. In other words, as the speed of the input shaft increases, the movable pulley element 5 is circumferentially displaced with respect to the stationary element 4 in the direction of the rotation of the pulley assembly against the influence of the torsional spring 10.

Figure 3:
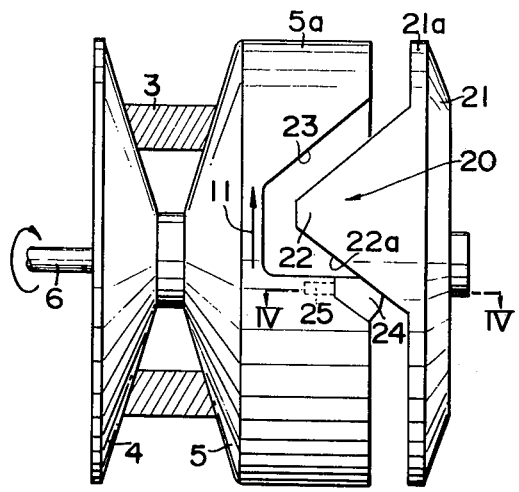
FIG. 3 is an elevational view substantially along the line III—III in FIG. 2 and as seen in the direction shown by arrows.
Figure 4:
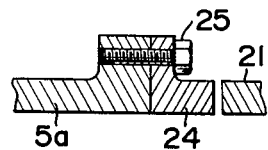
FIG. 4 is a fragmentary sectional view taken along the line IV—IV in FIG. 3.

The driving pulley assembly 1 is further provided with shift cam means 20 for determining the axial position of the movable pulley element 5 in accordance with the relative angular position of the movable element 5 with respect to the stationary element 4. As shown in FIG. 2, the sleeve 8 is provided at its outer end with an end cover 21 which has an axially extending circumferential portion 21a formed with a cam projection 22 having a slanted cam edge 22a. The movable pulley element 5 is also provided with an axially extending circumferential portion 5a opposing to the portion 21a on the end cover 21. The movable pulley element 5 has a cutout 23 at its portion 5a for accommodating the cam projection 22. At the cutout 23, a cam follower piece 24 is secured to the movable pulley element 5 by means of a bolt 25 and adapted to engage with the cam edge 22a on the end cover 21. The cam edge 22a is so formed that, when the movable element 5 is displaced with respect to the stationary element 4 in the direction of rotation of the pulley assembly 1 as shown by the arrow 11 in FIGS. 1 and 3 under the action of the centrifugal means, the movable element 5 is also displaced along the shaft 6 toward the stationary element 4 to decrease the spacing between the elements 4 and 5. As shown in FIGS. 2 and 3, the belt 3 has a substantially V-shaped cross-section and engages with the V-shaped groove 12 in the pulley assembly 1. The spacing between the stationary and movable elements 4 and 5 determines the diametrical position of the belt 3 in the pulley assembly 1, that is, the effective diameter of the pulley assembly 1.

Figure 6:
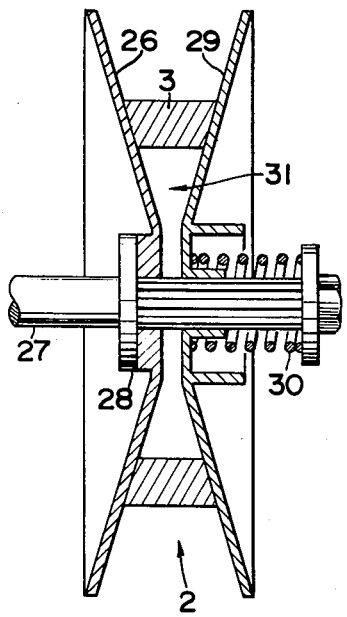
FIG. 6 is a sectional view taken along the line VI—VI in FIG. 1.

Referring now to FIG. 6 which shows the driven pulley assembly 2 in detail, the assembly 2 comprises a stationary pulley element 26 mounted on an output or driven shaft 27 against rotation with respect thereto. The output shaft 27 has a stop 28 for determining the axial position of the stationary element 26 on the shaft 27. A movable pulley element 29 is also mounted axially slidably on the shaft 29 and constantly biased toward the stationary element 26 by means of a spring 30. It should be noted that the driven pulley assembly 2 is of a conventional construction and a substantially V-shaped annular groove 31 is formed between the pulley elements 26 and 29 for receiving the endless belt 3.

In operation, the input shaft 6 is driven by a suitable prime mover such as an internal combustion engine of a vehicle. The centrifugal weights 14 apply centrifugal force on the associated rollers 15 so as to determined the angular position of the movable element 5 with respect to the stationary element 4. Thus, the axial position of the movable pulley element 5 is determined in accordance with the speed of the input shaft 6. The load on the output shaft 27 is transmitted to the driving pulley assembly 1 in the form of tension in the belt 3 applies a reaction force to the movable element 5 in the direction opposite to the arrow 11. Therefore, when an excessive load is applied on the output shaft 27, the movable element 5 is angularly displaced with respect to the stationary element 4 in the direction opposite to the arrow 11 with the result that the movable element 5 is axially displaced away from the stationary element 4. Thus, the spacing between the elements 4 and 5 is increased and the diametrical position of the belt 3 is inwardly displaced, for example, from the position shown by solid line to the position shown by broken line in FIG. 1 to decrease the effective diameter of the driving pulley assembly 1. As the belt 3 is radially inwardly displaced in the driving pulley assembly 1 as described above in response to an increase in the load, the movable element 29 in the driven pulley assembly 2 is axially displaced toward the stationary element 26 under the influence of the spring 3 to displace the belt 3 radially outwardly resulting in an increase in the effective diameter of the driven pulley assembly 2. Thus, the speed ratio of the transmission is increased to accommodate the increased load.

The invention has thus been shown and described with reference to a preferred embodiment, however, it should be noted that the invention is in no way limited to the details of the illustrated arrangement but changes a modifications may be made without departing from the scope of the appended claims.

We claim:

1. Infinitely variable transmission comprising a first pulley assembly including a stationary pulley element secured to a first shaft and a movable pulley element movable along and rotatable about the first shaft, said stationary and movable elements defining a V-shaped cricumferential groove therebetween, torsional spring means associated with the movable element of the first pulley assembly for biasing the element in one angular direction, centrifugal means for angularly urging the movable element of the first pulley assembly against the influence of the torsional spring means in accordance with the speed of said first shaft, and cam means for axially displacing said movable element of the first pulley assembly in accordance with angular displacement of the movable element with respect to the stationary element of the first pulley assembly; a second pulley assembly including a stationary pulley element secured to a second shaft and a movable pulley element slidable along the second shaft, said stationary and movable pulley elements defining a V-shaped circumferential groove therebetween, means for biasing the movable element toward the stationary element of the second pulley assembly; and an endless belt having a substantially V-shaped cross-sectional configuration for engaging said V-shaped grooves in the first and second pulley assemblies and extending around and between the pulley assemblies for establishing a power transmitting connection therebetween.

2. Infinitely variable transmission in accordance with claim 1 in which said centrifugal means comprises centrifugal weight means carried for rotation with said first shaft and follower means provided on said movable element of the first pulley assembly for engagement with said weight means to be angularly biased by said weight means.

3. Infinitely variable transmission in accordance with claim 1 in which said cam means comprises at least one cam edge formed on a member rotatable with the first shaft and a follower provided on the movable element of the first pulley assembly.

4. Infinitely variable transmission in accordance with claim 1 in which the movable element of the first pulley assembly is angularly biased in the direction opposite to the direction of rotation of the first pulley assembly, the centrifugal means being so arranged that it angularly biases the movable element of the first pulley assembly in the direction of rotation of the pulley assembly, the cam means being so arranged that it displaces the movable element toward the stationary element of the first pulley assembly when the movable element is displaced in the direction of rotation of the first pulley assembly.

5. Infinitely variable transmission in accordance with claim 1 in which said first shaft is an input shaft and said second shaft is an output shaft.

6. Pulley assembly for a V-belt type transmission comprising a stationary pulley element secured to a shaft and a movable pulley element movable along and rotatable about the shaft, said stationary and movable elements definng a V-shaped circumferential groove therebetween, torsional spring means associated with the movable element for biasing it in one angular direction, centrifugal means for angularly urging the movable element against the influence of the torsional spring means in accordance with the speed of the shaft, and cam means for axially displacing said movable element in accordance with angular displacement of the movable element with respect to the stationary element.

* * * * *